(12) United States Patent
Christmas

(10) Patent No.: US 11,243,495 B2
(45) Date of Patent: Feb. 8, 2022

(54) SPATIAL LIGHT MODULATOR FOR HOLOGRAPHIC PROJECTION

(71) Applicant: Dualitas Ltd, Knowlhill (GB)

(72) Inventor: Jamieson Christmas, Knowlhill (GB)

(73) Assignee: DUALITAS LTD, Milton Keynes (GB)

( * ) Notice: Subject to any disclaimer, the term of this patent is extended or adjusted under 35 U.S.C. 154(b) by 172 days.

(21) Appl. No.: 16/680,282

(22) Filed: Nov. 11, 2019

(65) Prior Publication Data
US 2020/0150590 A1 May 14, 2020

(30) Foreign Application Priority Data

Nov. 12, 2018 (GB) ..................... 1818358

(51) Int. Cl.
*G02B 5/32* (2006.01)
*G03H 1/22* (2006.01)
(Continued)

(52) U.S. Cl.
CPC ......... *G03H 1/2294* (2013.01); *G03H 1/0005* (2013.01); *G03H 1/0841* (2013.01);
(Continued)

(58) Field of Classification Search
CPC ...... G02B 5/32; G03H 1/2294; G03H 1/0005; G03H 1/0841; G03H 1/12;
(Continued)

(56) References Cited

U.S. PATENT DOCUMENTS

2010/0157399 A1  6/2010  Kroll
2011/0157667 A1* 6/2011  Lacoste ............... G03H 1/2205
                                                                    359/9
(Continued)

FOREIGN PATENT DOCUMENTS

GB  2496108 A  5/2013
GB  2526275 A  11/2015
(Continued)

OTHER PUBLICATIONS

Search Report under Section 17, United Kingdom Patent Application GB1818358.2, dated May 9, 2019.

*Primary Examiner* — Arnel C Lavarias
(74) *Attorney, Agent, or Firm* — McDonnell Boehnen Hulbert & Berghoff LLP

(57) ABSTRACT

There is provided a spatial light modulator arranged to display a light modulation pattern including a hologram. The spatial light modulator includes a liquid crystal on silicon spatial light modulator having a plurality of pixels. The hologram has a plurality of pixels. The spatial light modulator includes a silicon backplane. Each pixel of the spatial light modulator includes a light-modulating element and a respective pixel circuit. Each pixel circuit is embedded in the silicon backplane. Each pixel circuit is arranged to drive the corresponding light-modulating element. Each pixel circuit is further arranged to combine a received pixel value of the hologram with a corresponding pixel value of the light processing function such that the light modulation pattern further includes the light processing function. The light processing function includes a lens function and/or a grating function.

15 Claims, 11 Drawing Sheets

(51) Int. Cl.
  *G03H 1/00* (2006.01)
  *G03H 1/08* (2006.01)
  *G03H 1/12* (2006.01)
  *G03H 1/02* (2006.01)
(52) U.S. Cl.
  CPC ....... *G03H 1/12* (2013.01); *G03H 2001/0066* (2013.01); *G03H 2001/0224* (2013.01)
(58) Field of Classification Search
  CPC ... G03H 2001/0066; G03H 2001/0224; G03H 1/00; G03H 2001/0228; G03H 1/0443; G03H 2001/045; G03H 1/08; G03H 1/0866; G03H 1/0891; G03H 1/16; G03H 2226/00; G03H 2226/02; G03H 2226/11
  USPC ............ 359/15, 1, 9, 19, 21, 29, 32, 33, 35; 430/1, 2
  See application file for complete search history.

(56) References Cited

U.S. PATENT DOCUMENTS

| | | |
|---|---|---|
| 2012/0008181 A1 | 1/2012 | Cable |
| 2013/0194644 A1 | 8/2013 | Cable |
| 2013/0265622 A1 | 10/2013 | Christmas et al. |
| 2014/0022526 A1 | 1/2014 | Van Eijk et al. |
| 2014/0253987 A1 | 9/2014 | Christmas |
| 2015/0098066 A1 | 4/2015 | Jurbergs |
| 2016/0077339 A1* | 3/2016 | Christmas .......... G02B 27/0172 359/11 |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2019/0025757 A1* | 1/2019 | Mullins ................ G03H 1/0005 |
| 2019/0041641 A1 | 2/2019 | Christmas et al. |
| 2019/0064738 A1 | 2/2019 | Cole et al. |
| 2020/0041957 A1* | 2/2020 | Mullins ................ G03H 1/2294 |

FOREIGN PATENT DOCUMENTS

| | | |
|---|---|---|
| GB | 2554472 A | 4/2018 |
| GB | 2554575 A | 4/2018 |
| GB | 2552851 A | 2/2019 |
| GB | 2567409 A | 4/2019 |
| GB | 2567410 A | 4/2019 |
| GB | 2569206 A | 6/2019 |
| GB | 2569208 A | 6/2019 |
| GB | 2560490 A | 9/2019 |
| WO | 2008138986 A2 | 11/2008 |
| WO | 2018078366 A1 | 5/2018 |
| WO | 2018100394 A1 | 6/2018 |
| WO | 2018100397 A1 | 6/2018 |

* cited by examiner

SPATIAL LIGHT MODULATOR FOR HOLOGRAPHIC PROJECTION

CROSS-REFERENCE TO RELATED APPLICATIONS

This application claims the benefit of priority of United Kingdom Patent Application no. 1818358.2, filed Nov. 12, 2018, which is hereby incorporated herein by reference in its entirety.

FIELD

The present disclosure relates to a spatial light modulator, a holographic projector, a method of displaying a light modulation pattern comprising a hologram and a method of holographic projection. More specifically, the present disclosure relates to a liquid crystal on silicon spatial light modulator and a method of driving a spatial light modulator such as a liquid crystal on silicon spatial light modulator. Some embodiments relate to a method of reducing the amount of data streamed to a spatial light modulator for holographic projection and a method of decreasing the pixel size of a spatial light modulator for holographic projection. Other embodiments relate to the silicon backplane of a spatial light modulator and a method of mapping hologram pixels onto light modulating elements of a spatial light modulator. Further embodiments relate to a head-up display comprising the holographic projector.

Background and introduction Light scattered from an object contains both amplitude and phase information. This amplitude and phase information can be captured on a photosensitive plate or film using an interference technique called holography. The pattern captured on the photosensitive plate or film is referred to as a holographic recording or hologram. The hologram may be used to form a reconstruction of the object. The reconstruction of the object formed by the hologram is referred to as a holographic reconstruction. The holographic reconstruction may be formed by illuminating the hologram with suitable light.

Computer-generated holography may numerically simulate the processes used to form a hologram by interference of light. A computer-generated hologram may be calculated using a mathematical transformation. The mathematical transform may be based on a Fourier transform. The mathematical transform may be a Fourier transform or Fresnel transform. A hologram calculated by performing a Fourier transform of a target image may be referred to as a Fourier transform hologram or Fourier hologram. A Fourier hologram may be considered a Fourier domain, or frequency domain, representation of the target image. A hologram calculated using a Fresnel transform may be referred to as a Fresnel hologram.

A computer-generated hologram may comprise an array of hologram values which may be referred to as hologram pixels. Each hologram value may be a phase and/or amplitude value. Each hologram value may be constrained—e.g. quantised—to one of a plurality of allowable values. A computer-generated hologram may be displayed on a display device. The choice of allowable values may be based on the display device which will be used to display the hologram. The plurality of allowable values may be based on the capabilities of the display device.

The display device may be a spatial light modulator comprising an array of pixels. The spatial light modulator may be a liquid crystal device in which case each pixel is an individually-addressable liquid crystal cell having birefringence. Each pixel may modulate the amplitude and/or phase of light in accordance with a corresponding hologram pixel. Each pixel comprises a light-modulating element and a pixel circuit arranged to drive the light-modulating element. The displayed pattern may be considered a light modulation pattern.

A holographic reconstruction may be formed by illuminating the displayed pattern with suitable light. The amplitude and/or phase of incident light is spatially modulated in accordance with the light modulation pattern. The light is diffracted by the spatial light modulator. The complex light pattern emanating from the display device interferes at a replay plane to form a holographic reconstruction corresponding to the target image. If the hologram is a Fourier hologram, the replay plane is in the far-field (i.e. an infinite distance from the display device) but a lens may be used to bring the replay plane into the near-field. For convenience, the holographic reconstruction itself may be referred to as an image. The holographic reconstruction is projected onto a plane away from the display device and the technique is therefore known as holographic projection. A head-up display may be formed using a holographic projector but many other devices, such as a head-mounted display, may use a holographic projector in accordance with the present disclosure as the image source.

The present disclosure relates to an improved liquid crystal on silicon spatial light modulator for holographic projection.

SUMMARY

The holograms in accordance with the present disclosure comprise a plurality of pixels—for example, [xxy] pixels. If the hologram has fewer pixels than the display device, the hologram may be tiled onto the display device. Tiling uses the extra pixels of the display device to display repeats of at least part of the hologram. Tiling results in the display of a tiled pattern on the display device, wherein the tiled pattern comprises a plurality of tiles. A tile is continuous, contiguous group of pixels of the hologram. The plurality of tiles may comprise any number of full-tiles and any number of part-tiles of the hologram. A full-tile is the complete hologram. That is, a full-tile is the complete, contiguous group of [xxy] pixels of the hologram. A part-tile is a subset of the hologram. That is, a part-tile is a continuous, contiguous subset of the [xxy] pixels of hologram. In some embodiments, tiling is used to fill the display device. That is, tiling may use all pixels of the display device to display the hologram. In some embodiments, all tiles are quadrangular. In some embodiments, all tiles are rectangular. Each tile may have any size or aspect ratio, as required.

The hologram which is repeated on the display device is referred to herein as the input hologram because it is the source used for the tiling and optional further processing. The input hologram is tiled to form a new hologram referred to herein as the second hologram. The second hologram comprises more pixels than the input hologram. The final hologram which is displayed on the display device is referred to herein as the output hologram or light modulation pattern. The second hologram may or may not be further processed before display. Therefore, the second hologram may or may not be the output hologram.

Pixel mapping circuitry implements a tiling scheme. A tiling scheme in accordance with the present disclosure is a unique pixel mapping scheme which maps groups of contiguous pixels of the first, input hologram onto the pixels of a second hologram such that all pixels of the second hologram correspond to one pixel of the input hologram. It will therefore be understood that some pixels of the input hologram correspond to multiple pixels of the second hologram. It may be said that there is a one-to-many correlation between some pixels of the input hologram and the pixels of the second hologram. The number of tiles may be two to twelve, such as four to ten. Each tile comprises at least two pixels.

There is provided a spatial light modulator arranged to display a light modulation pattern comprising a hologram. The spatial light modulator is a liquid crystal on silicon spatial light modulator having a plurality of (display) pixels. The hologram has a plurality of (hologram) pixels. The spatial light modulator comprises a silicon backplane. Each pixel of the spatial light modulator comprises a light-modulating element and a respective pixel circuit. Each pixel circuit is embedded in the silicon backplane. Each pixel circuit is arranged to drive the corresponding light-modulating element. Each pixel circuit is further arranged to combine a received pixel value of the hologram with a corresponding pixel value of the light processing function such that the light modulation pattern further comprises the light processing function. The light processing function comprises a lens function and/or a grating function.

At least one light processing function (e.g. a lens function imparting optical power and/or a grating function having a light steering effect) is combined with the hologram in the silicon backplane of the display device. For the avoidance of doubt, the displayed light modulation pattern comprises a hologram and a light processing function. The light modulation pattern may be a sum of the hologram and light processing function. Combining at least one light processing function with the hologram in the silicon backplane of the display device is highly significant and breaks from convention. The inventors have appreciated that the pixel values of a light processing function are solely determined by the spatial locations of the pixels on the display device. Therefore, the processing required to add these functions can conveniently be provided at the display pixel level. This means that the processing load on resource-heavy components prior to the display device, such as the display driver or hologram calculation engine, can be reduced. Further advantageously, by moving this particular processing into the silicon backplane, tiling schemes can also be applied in the silicon backplane of the display device. For the avoidance of doubt, the tiling processes can only be moved into the silicon backplane because the light processing functions are provided in the silicon backplane. The reason for this is that the light processing functions must be combined with the hologram after tiling. In some embodiments, the pixels values of at least one light processing function are hardwired into the silicon backplane.

The hologram may comprise [x×y] pixels and the spatial light modulator may comprise [m×n] pixels, wherein mn≥xy. The silicon backplane may further comprise pixel mapping circuitry. The pixel mapping circuitry is arranged to receive each pixel value of the hologram. The pixel mapping circuitry is further arranged to route each pixel value of the hologram to a plurality of pixels of the spatial light modulator. Accordingly, the hologram is displayed on the light-modulating elements of the spatial light modulator in accordance with the pixel mapping circuitry. More specifically, the hologram is tiled onto the light-modulating elements of the spatial light modulator in accordance with the pixel mapping circuitry. The light-processing function may comprise [m×n] pixels.

The light modulation pattern comprises a plurality of tiles of the input hologram, wherein a tile is a continuous, contiguous group of pixels of the input hologram. The tiling scheme is a pixel mapping scheme comprises one-to-many mapping between at least some pixels of the input hologram and the pixels of the spatial light modulator.

The total number of pixels in each input hologram is less than the number of pixels in the corresponding second hologram or holograms represented on the spatial light modulator. For example, the input hologram can be smaller than the second hologram in both dimensions (m>x and n>y) or smaller than the second hologram in only one dimension (m>x, n=y or m=x, n>y). This arrangement enables mapping of every part of the input hologram to a location somewhere in the second hologram. In embodiments, the whole input hologram is mapped as a continuous set of pixels. In other examples, the input hologram is broken up into multiple sets of pixels in the mapping such that the second hologram does not comprise a continuous representation of the entire input hologram. That is, in these other examples, the second hologram does not comprise a full-tile. In embodiments, each second hologram comprises at least one full tile and, optionally, a plurality of part-tiles. Pixels of each received, input hologram are mapped onto at least one corresponding larger, second hologram using a dynamic/changeable tiling scheme. At least one pixel of the input hologram is repeated in the second hologram. For example, the pixel array of the spatial light modulator can be divided up into a number of discrete areas, each of which is arranged to represent at least a subset of the input hologram. Part of the input hologram (that is, a continuous subset of the pixels of the hologram) can therefore be repeated on those spatial light modulator pixels which would otherwise have been unused.

Embedding pixel mapping circuitry providing one-to-many pixel mapping in the silicon backplane of the spatial light modulator provides the technical advancement of increasing the rate at which each pixel of the spatial light modulator can be updated (e.g. switched) when the hologram is tiled onto the display device. This technical advancement is provided because less data needs to be streamed to the display device to display each light modulation pattern. In embodiments, the display device is a liquid crystal on silicon spatial light modulator. The technical advancement provided reduces constraints on pixel size caused by the pixel capacitors and increases the rate at which the displayed light modulation pattern can be updated (e.g. changed). For example, more complex (e.g. longer) tile-shifting sequences may be employed for each input hologram and/or more complex image interlacing techniques may be employed (e.g. a great number of holographic reconstructions may be interlaced to form each display image). Both of these techniques are found to improve the image quality of a holographic projection.

In some embodiments, m≥2x and n≥2y. Accordingly, each pixel value of the hologram is routed to at least four pixels of the spatial light modulator. The inventors have also found that the disclosed technique is particularly effective when the output hologram comprises at least one full-tile and each pixel of the input hologram is repeated at least once in the output hologram in both directions of the array of pixel values. This is achieved when m≥2x and n≥2y.

The hologram may be tiled onto the spatial light modulator such that there is displayed thereon at least one full-tile of the hologram. The inventors have found that, for data streaming (in particular, data reading), it is advantageous if the displayed light modulation pattern comprises one full-tile. For the avoidance of any doubt, a full-tile is the complete, contiguous group of [x×y] pixels of the input hologram. In some embodiments, each light modulation pattern additionally comprises a plurality of part-tiles, wherein each part-tile is a contiguous subset of pixels of the input hologram.

Adjacent tiles of the hologram may be connected end to end. Thus, adjacent edges of a pair of adjacent tiles each comprise an end of the hologram. Accordingly, each tile comprises at least one end or boundary of the input hologram. More specifically, each tile comprises at least one end row of pixels or end column of pixels of the hologram. An end row/column of the input hologram is one of the four boundary rows and columns of pixels of the input hologram. More specifically, an end row/column is the first or the last row/column of pixels of the input hologram. The first row/column of pixels is opposite the last row/column of pixels. For example, row 1 is opposite row x and column 1 is opposite column y. In some embodiments, the tiling is continuous which means that all pairs of adjacent tiles connect one end of the input hologram to the opposite end of the input hologram. For example, adjacent tiles may connect column y to column 1 or row x to row 1. It may be said that all adjacent tiles either connect the last column of pixels of the input hologram to the first column of pixels of the input hologram or the last row of pixels of the input hologram to the first row of pixels of the input hologram.

The inventors have found that if adjacent tiles introduce a mid-sequence discontinuity in the repeating sequence of pixel values of the input hologram, artefacts are observed in the holographic reconstruction which are detrimental to the perceived quality of the image. These artefacts are minimised when each row and each column of the tiled hologram does not break the sequence of pixel values of the input hologram. That is, each row and column is a continuous repeat of the corresponding row or column of the input hologram. The tiles of a continuous tiled pattern connect the repeating pattern end to end. The tiled hologram does not comprise any rows or columns which include a jump in the sequence of pixel values or omit pixel values in the sequence. It may be said that these embodiments form continuous repeats of the hologram pattern.

Each pixel circuit may comprise a pixel capacitor connected to the light-modulating element. The pixel capacitor is arranged to charge the light-modulating element. Each light-modulating element may comprise liquid crystal. In accordance with the present disclosure, the physical size of each pixel capacitor may be reduced because the pixels of the display device may be refreshed more frequently. Since the spatial light modulator is a liquid crystal on silicon spatial light modulator, the pixels comprise liquid crystal and the liquid crystal may be switched more frequently.

There is also provided a holographic projector comprising the spatial light modulator and a light source arranged to illuminate the light modulation pattern with coherent light. Accordingly, a holographic reconstruction corresponding to the hologram is formed on a replay plane. The present disclosure describes an architecture which unlocks various possibilities for improving image quality in a holographic projector. The replay plane is spatially-separated from the spatial light modulator.

The holographic projector may further comprise a driver arranged to send a plurality of holograms, each comprising [x×y] pixels, to the spatial light modulator. The display driver is a complex component of a holographic projector. The present disclosure describes an approach which significantly reduces the demands placed on the driver.

There is further provided a method of displaying a light modulation pattern on a spatial light modulator. The light modulation pattern comprises a hologram. The hologram comprises a plurality of (hologram) pixels. The spatial light modulator comprises a liquid crystal on silicon spatial light modulator having a plurality of (display) pixels. The spatial light modulator comprises a silicon backplane. Each pixel of the spatial light modulator comprises a light-modulating element and a respective pixel circuit. Each pixel circuit is embedded in the silicon backplane. The method comprises a first step of combining a received pixel value of the hologram with a corresponding pixel value of a light processing function. The light modulation pattern displayed on the spatial light modulator therefore further comprises the light processing function. The light processing function is a lens function and/or a grating function.

The hologram may comprise [x×y] pixels and the spatial light modulator may comprise [m×n] pixels, wherein mn>xy. The method may comprise a second step of routing each pixel value of the hologram to a plurality of pixels of the spatial light modulator using pixel mapping circuitry. The hologram is therefore tiled onto the light-modulating elements of the spatial light modulator. The pixel mapping circuitry is embedded in the silicon backplane of the spatial light modulator.

The hologram may be tiled onto light-modulating elements of the spatial light modulator by connecting tiles of the hologram end to end.

There is yet further provided a method of holographic projection comprising the method of displaying a light modulation pattern on a spatial light modulator. The method of holographic projection may further comprise illuminating the light modulation pattern with coherent light from a light source to form a holographic reconstruction corresponding to the hologram on a replay plane. The replay plane is spatially-separated from the spatial light modulator.

The method of holographic projection may further comprise using the same steps to form a second holographic reconstruction corresponding to a second hologram and using the grating function to displace the second holographic reconstruction on the replay plane with respect to the first holographic reconstruction to form image spots of the second holographic in the spaces between image spots of the first holographic reconstruction.

The first and second holographic reconstruction may be interlaced such that a viewer of the replay plane perceives a holographic reconstruction having a higher resolution than the first holographic reconstruction or second holographic projection.

There is also provided a spatial light modulator arranged to display a light modulation pattern comprising a hologram. The hologram has [x×y] pixels. The spatial light modulator a liquid crystal on silicon spatial light modulator compring a silicon backplane. The spatial light modulator further comprises [m×n] pixels, wherein mn>xy. Each pixel of the spatial light modulator comprises a light-modulating element and a pixel circuit. Each pixel circuit is embedded in the silicon backplane. Each pixel circuit is arranged to drive the corresponding light-modulating element. The silicon backplane further comprises pixel mapping circuitry. The pixel mapping circuitry is arranged to receive each pixel value of the hologram. The pixel mapping circuitry is further arranged to route each pixel value of the hologram to a plurality of pixels of the spatial light modulator. Accordingly, the hologram is displayed on the light-modulating elements of the spatial light modulator in accordance with the pixel mapping circuitry. More specifically, the hologram is tiled onto the light-modulating elements of the spatial light modulator in accordance with the pixel mapping circuitry. Optionally, the light-modulation pattern may further comprise a light processing function having [m×n] pixels. Each pixel circuit may be further arranged to combine the received pixel value of the hologram with a corresponding pixel value of the light processing function in order to display the light modulation pattern on the spatial light modulator. The light processing function may comprise a lens function and/or a grating function.

In some arrangements, the holographic projector is configured to form a colour holographic reconstruction. In some examples, this is achieved by the method known as Spatially Separated Colours, or "SSC", in which a plurality of different colour (e.g. red, green and blue) holographic reconstructions are superimposed by using a respective plurality of monochromatic light sources and a respective plurality of single colour holograms. Each respective hologram may be represented on a respective spatial light modulator or a respective plurality of pixels of one common spatial light modulator. It may therefore be understood that in these examples, a plurality of light channels are used. Each light channel may use a respective plurality of different tiling schemes as described herein because the colour channels are independent. The plurality of different tiling schemes may therefore be same for each colour channel or different.

One or more different tiling schemes can be used to form the output computer-generated hologram represented on the respective spatial light modulator of each colour channel. In this way, a single frame colour holographic reconstruction can be formed using first, second and third tiling schemes which are different to one another, or one or more of them could be the same.

A colour holographic reconstruction may also be achieved using a method known as Frame Sequential Colour, or "FSC". In an example FSC system, three lasers are used (red, green and blue) and each laser is fired in succession at a single SLM to produce each frame of the video. The colours are cycled (red, green, blue, red, green, blue, etc.) at a high enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on. An advantage of the FSC method is that the whole SLM is used for each colour. This means that the quality of the three colour images produced will not be compromised because all pixels on the SLM are used for each of the colour images.

In some embodiments, the tiling scheme tiles the input hologram onto the display device line by line. It can be quicker to form the output computer-generated hologram in this way, as compared to forming the output computer generated hologram tile by tile or even pixel by pixel, because long sequences of data may be mapped in the order they are stored in the memory. This can reduce the computational load on the tiling engine.

The holographic projector may further comprise a hologram engine configured to provide the input hologram to the tiling engine. The processor may be configured to calculate the input hologram from a target image. This calculation may occur in real-time using the method described herein. In some embodiments, generation of the input hologram comprises first down-sizing the target image such that the number of pixels of the input hologram is less than the number of pixels of the initial target image and less than the number of pixels of the display device. Alternatively, the processor can be configured to retrieve the input hologram from a repository of previously generated holograms, for example, previously generated holograms stored on a computer readable medium or other storage device.

In some examples, the spatial light modulator applies phase-only modulation to the light received. The spatial light modulator may thus be a phase-only spatial light modulator. This may be advantageous because no optical energy is lost by modulating amplitude. Accordingly, an efficient holographic projection system is provided. However, the present disclosure may equally be implemented on an amplitude-only spatial light modulator or an amplitude and phase (complex) spatial light modulator. It may be understood that the hologram will be correspondingly phase-only, amplitude-only or fully-complex.

The term "hologram" is used to refer to the recording which contains amplitude and/or phase information about the object. In this disclosure, the input, or received, hologram is a hologram. The entirety of the output, computer-generated, hologram is also a hologram—the term "hologram" encompasses the combination of a full-tile of the input hologram and additional part-tiles. The term "holographic reconstruction" is used to refer to the optical reconstruction of the object which is formed by illuminating the hologram. The term "replay plane" is used to refer to the plane in space where the holographic reconstruction is formed. The terms "image", "image region" and "replay field" refer to areas of the replay plane illuminated by light forming the holographic reconstruction. In some embodiments, the "image" comprises image spots which may be referred to as "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" or "represent" a light modulation distribution or pattern in response to receiving the plurality of control values.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating.

For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "light" is used herein in its broadest sense. Some embodiments are equally applicable to visible light, infrared light and ultraviolet light, and any combination thereof.

The present disclosure refers to or describes 1D and 2D holographic reconstructions by way of example only. The holographic reconstruction may alternatively be a 3D holographic reconstruction.

That is, in some examples of the present disclosure, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in a co-dependent relationship.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Optical Configuration

Figure 1:
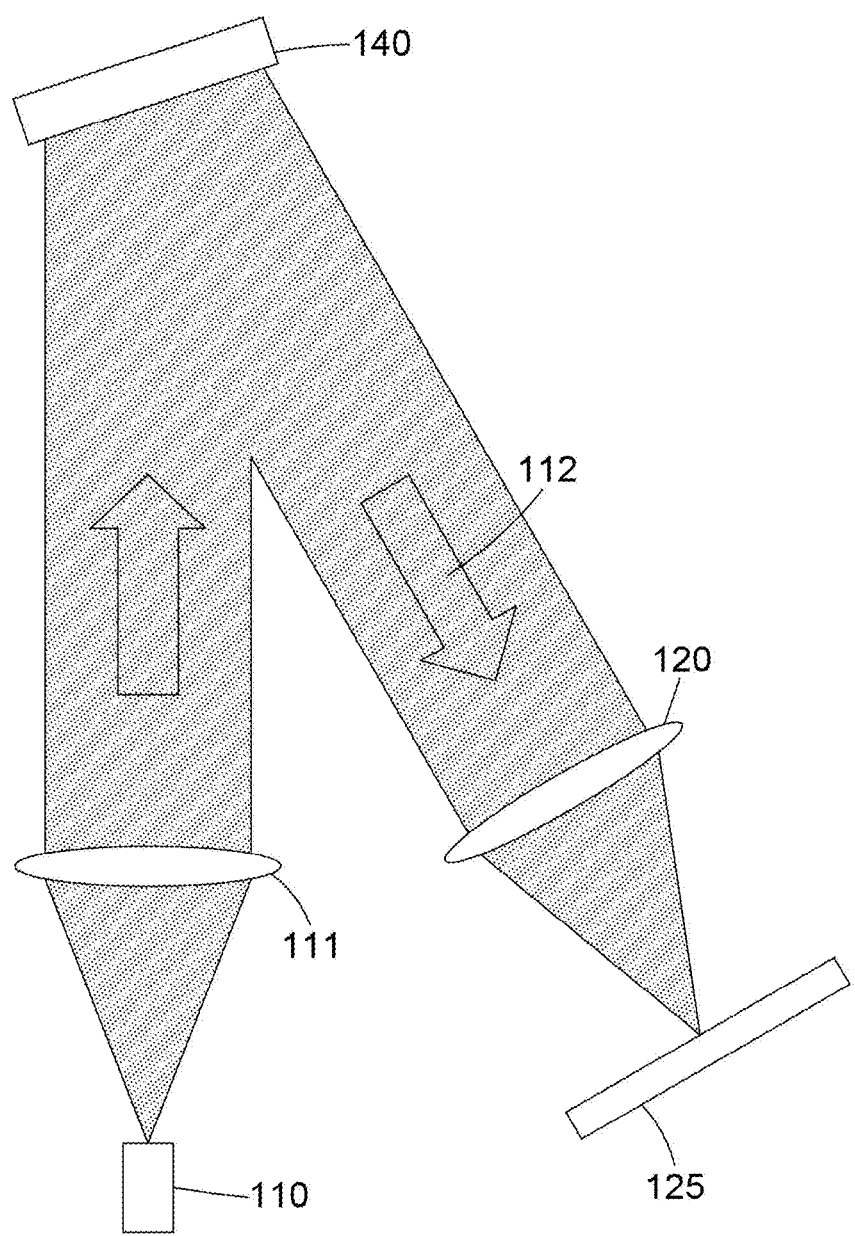
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
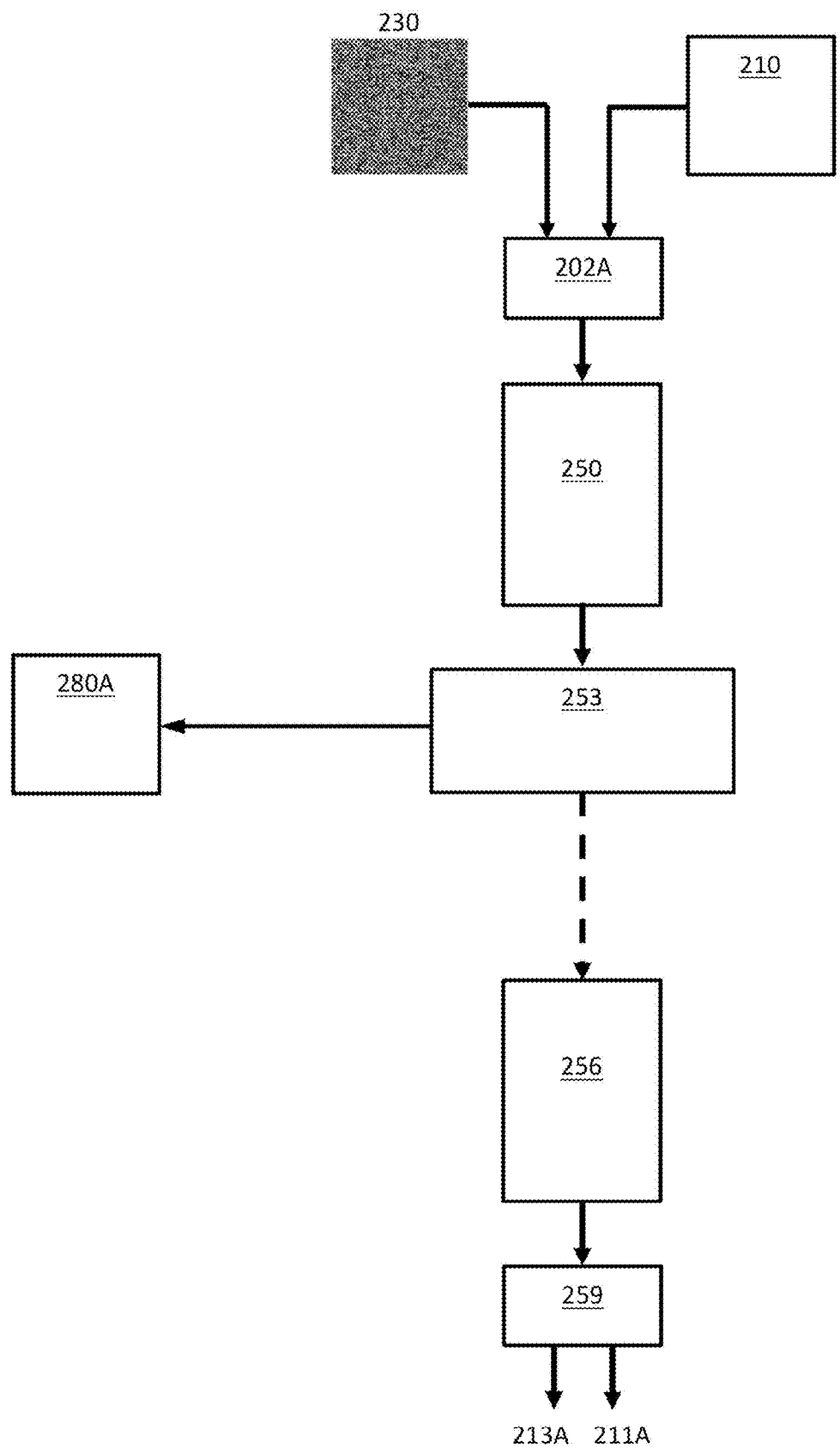
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
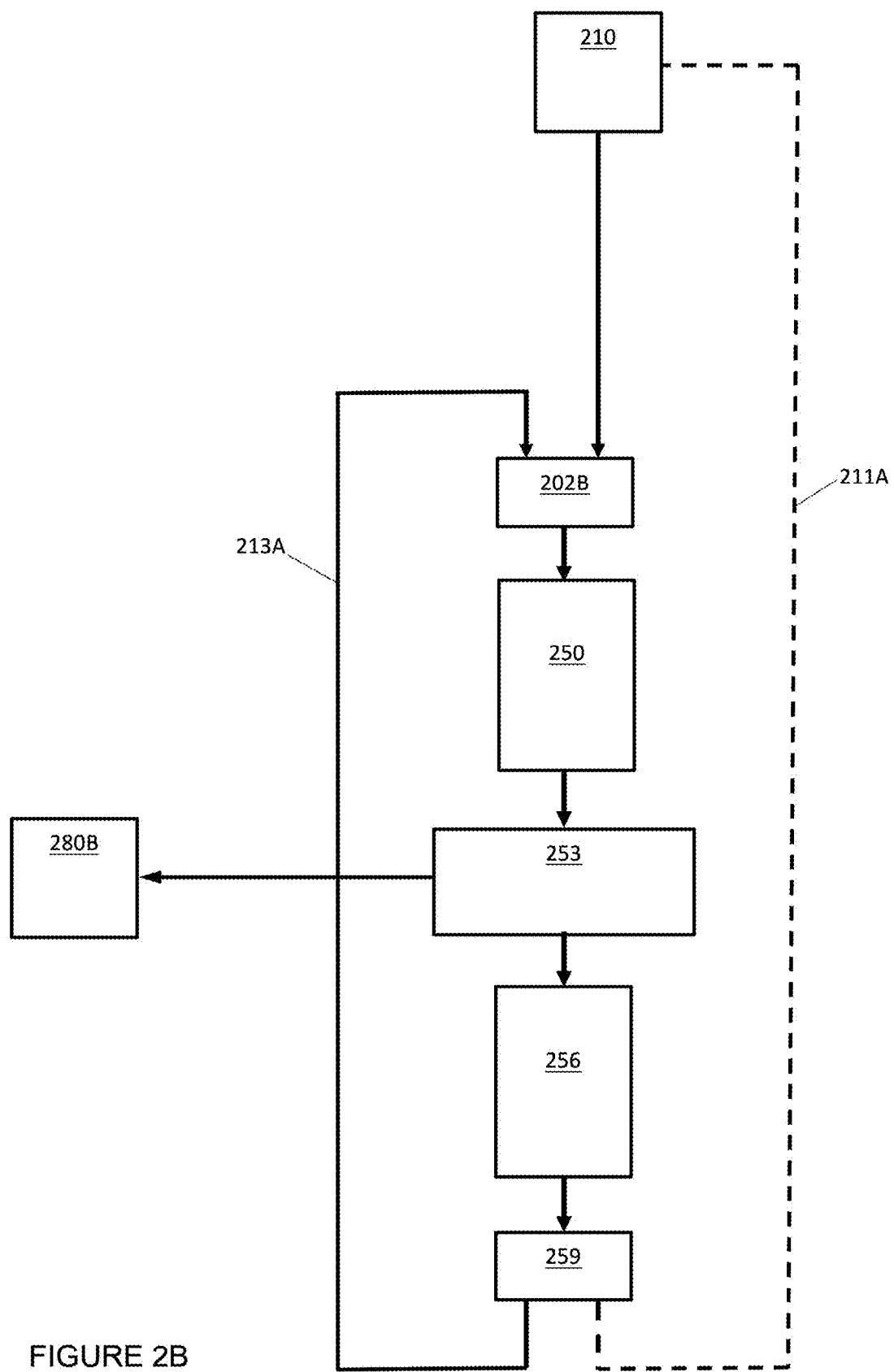
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
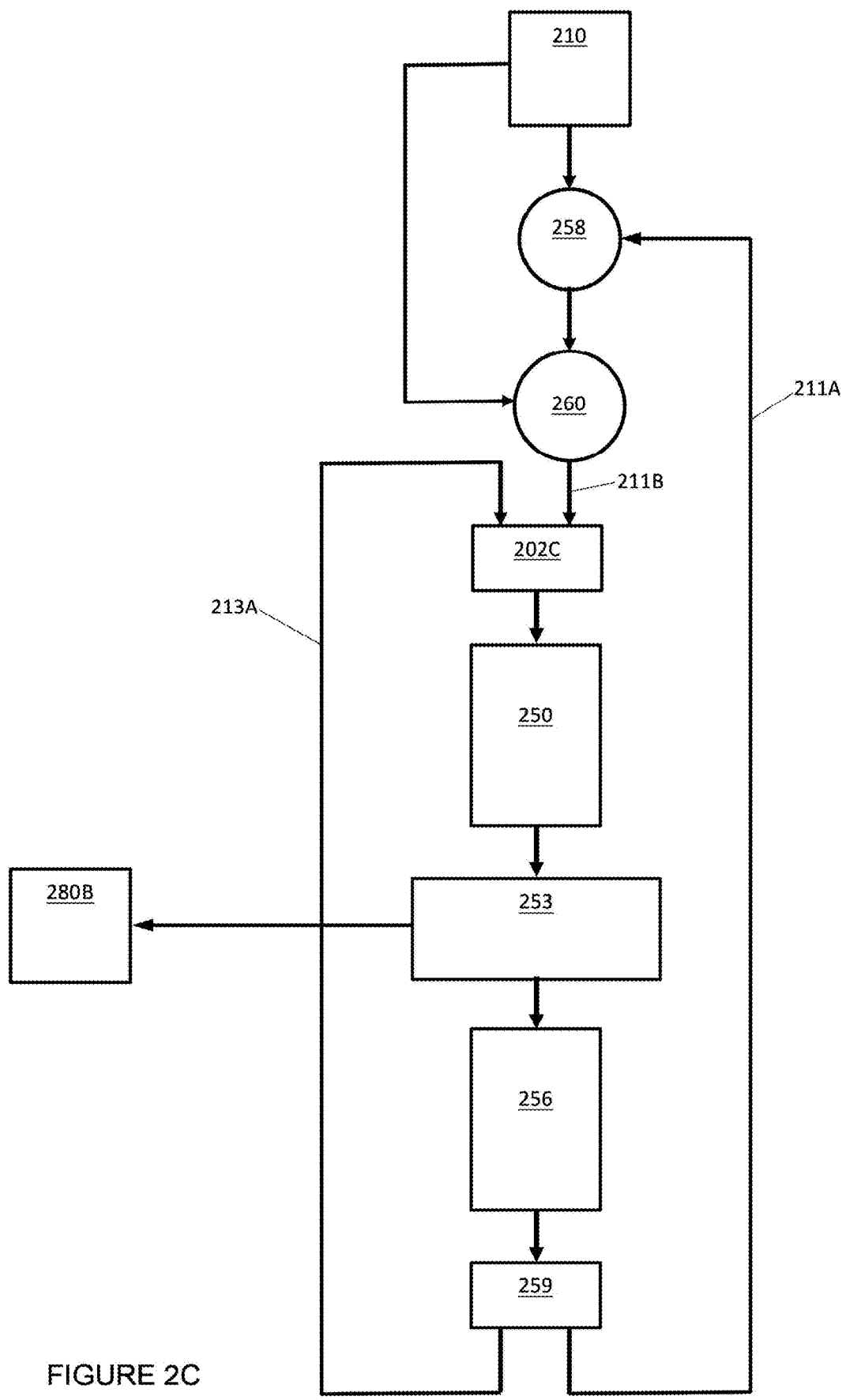
FIG. 2C illustrates alternative second and subsequent iterations of the example.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\Psi_n[u,v])\}$$

$$\Psi_n[u,v] = \angle F\{\eta \cdot \exp(i\angle R_n[x,y])\}$$

$$\eta = T[x,y] - \alpha(R_n[x,y] - T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In accordance with the present disclosure, the spatial light modulator is a liquid crystal on silicon (LCOS) spatial light modulator. Thus, the light-modulating elements (i.e. the pixels) of the spatial light modulator are cells containing liquid crystal. That is, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective LCOS spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface in a silicon backplane. The results in a higher aperture ratio. In other words, the pixels are closely packed meaning there is very little dead space between the pixels. This is advantageous because it reduces the optical noise in the replay field. A LCOS SLM comprises a silicon backplane which has the advantage that the pixels are optically flat. This is particularly important for a phase modulating device. In addition, the silicon backplane may incorporate pixel addressing circuitry in addition to pixel drive circuitry as described below with reference to FIG. 4.

Figure 3:
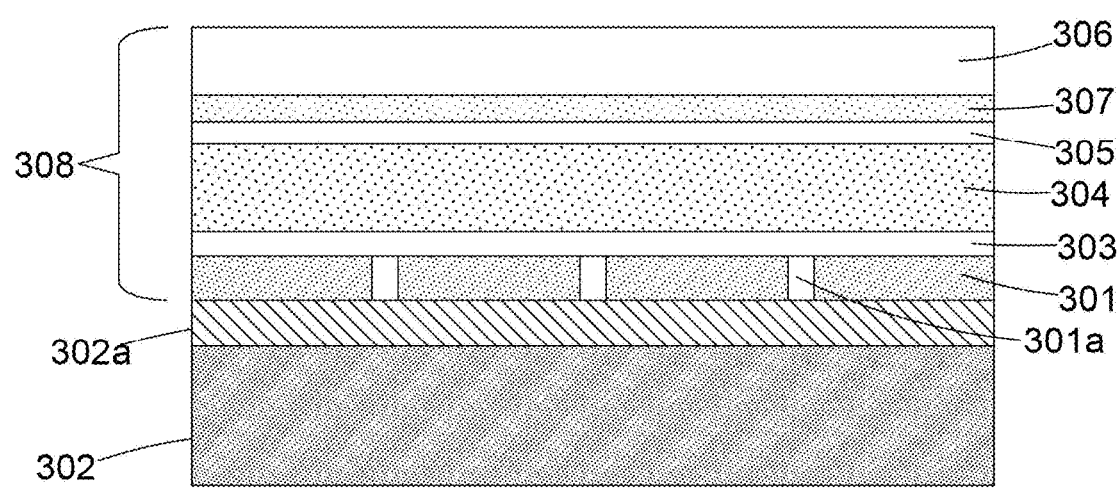
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM. In embodiments, the received computer-generated hologram is an input hologram to a tiling engine. The input hologram is "tiled" on the spatial light modulator in accordance with a tiling scheme and the tiling scheme is dynamically changed, for example, it is changed between input holograms. The concepts of a "tile" and "tiling" are further explained with reference to FIG. 4.

Backplane Architecture

Figure 4:
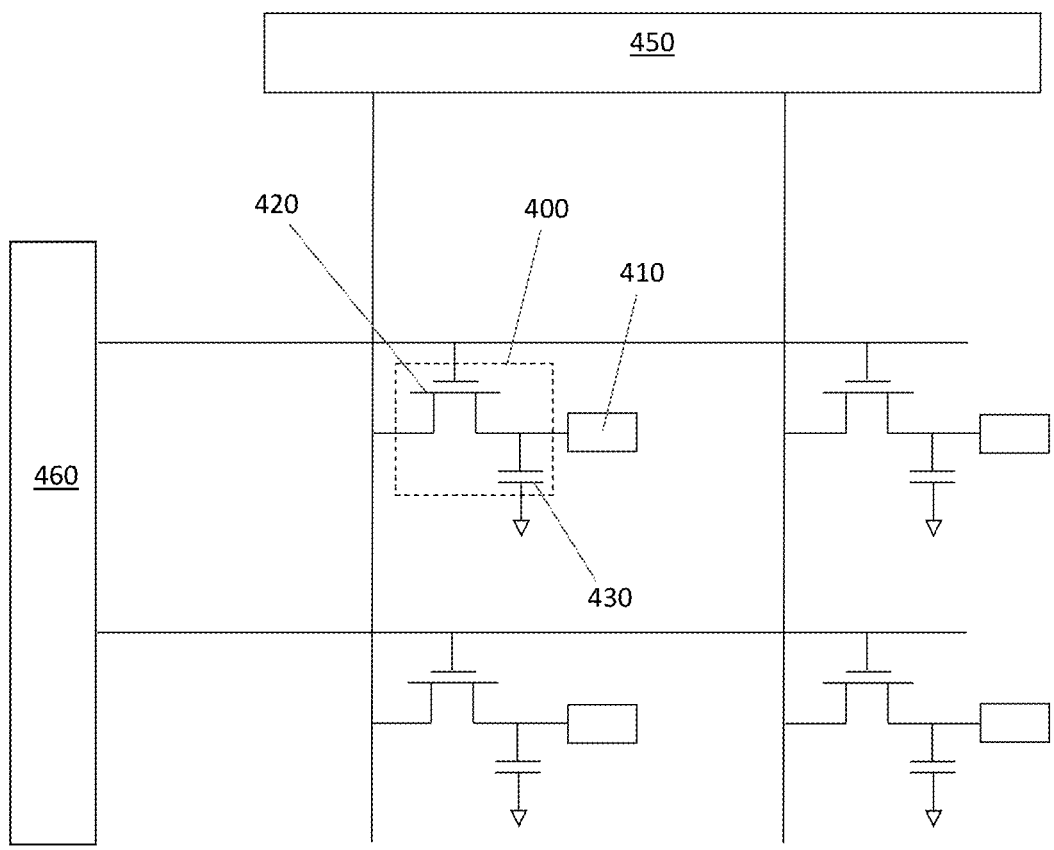
FIG. 4 shows an example silicon backplane for a liquid crystal display.

FIG. 4 shows an example silicon backplane for a liquid crystal (e.g. LCOS SLM) display. The person skilled in the art will be familiar with the general architecture comprising pixel addressing circuitry including a column driver 450, a row driver 460 and a grid of column lines and row lines for addressing the pixels of the display. The column lines may carry a data signal and the row lines may carry a gate signal. Each pixel is positioned at the intersection between a column lines and row lines such that each pixel may be individually controlled.

FIG. 4 shows four pixels by way of example only. The architecture may be scaled to drive any number of pixels such as 1024×768 pixels. Each pixel comprises a pixel circuit 400. Each pixel also comprises a light-modulating element. In the example of FIG. 4, the light-modulating element is liquid crystal 410. In the example shown, each pixel circuit comprises a transistor 420 and a charge storage capacitor 430. The pixel capacitor 430 is connected to the liquid crystal 410. In some embodiments, the pixel capacitor 430 is connected in parallel to the liquid crystal 410. The present disclosure relates to a silicon backplane, such as an analogue backplane, in which each pixel circuit comprises a pixel capacitor 430 arranged to store charge for driving (e.g. switching) the liquid crystal 410. The silicon backplane comprising pixel addressing circuitry and pixel circuits 400 for driving respective pixels may be formed using conventional silicon chip manufacturing processes, such as CMOS processes. It may be said that the silicon backplane is a CMOS silicon backplane. FIG. 4 shows a plurality of simple pixel circuits by way of example only. In the configuration shown, the pixel capacitor 430 charges in parallel with the liquid crystal 410. In the example shown, the pixel capacitor functions as an electrical ballast. However, the person skilled in the art may be familiar with various more advanced arrangements in which each pixel circuit includes a plurality of transistors and/or a plurality of capacitors. For example, a second transistor may be included to control when charge flows from the pixel capacitor 430 to the liquid crystal 410 to switch the liquid crystals. The pixel circuit is embedded behind the pixels and the physical size of the pixel circuit is limited by the pixel size. In most display devices, small pixels are generally preferred. However, the size of the pixel capacitor may limit the pixel size of the display device.

Hologram Tiling

Figure 5:
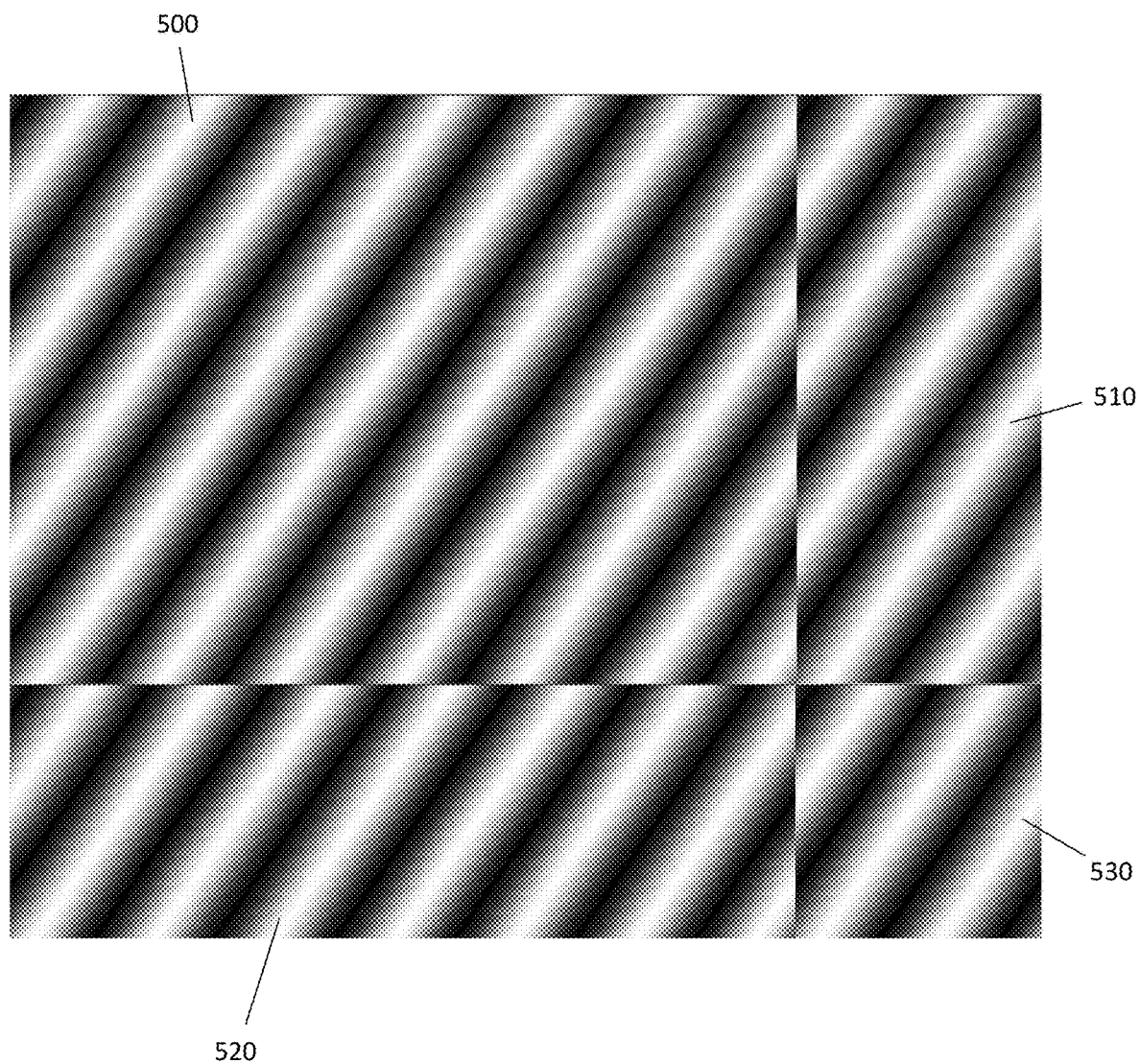
FIG. 5 shows an example of a second hologram formed by tiling a first hologram.

FIG. 5 shows an example hologram formed by tiling an input hologram. The hologram has more pixels than the input hologram in both directions. It may be said that this hologram is formed by tiling the input hologram onto a canvas comprising more pixels than the input hologram. The hologram shown in FIG. 5 comprises a full-tile 500, a first part-tile 510, a second part-tile 520 and a third part-tile 530. In preferred embodiments, adjacent tiles of the hologram are connected end to end. That is, all adjacent tiles either connect the last column of pixels of the input hologram to the first column of pixels of the input hologram or the last row of pixels of the input hologram to the first row of pixels of the input hologram.

The hologram may be further processed after tiling and before being displayed on the display device. In some embodiments, a lensing function and/or grating function (as described elsewhere in this document) are/is combined with the tiled hologram before it is displayed.

Figure 6:
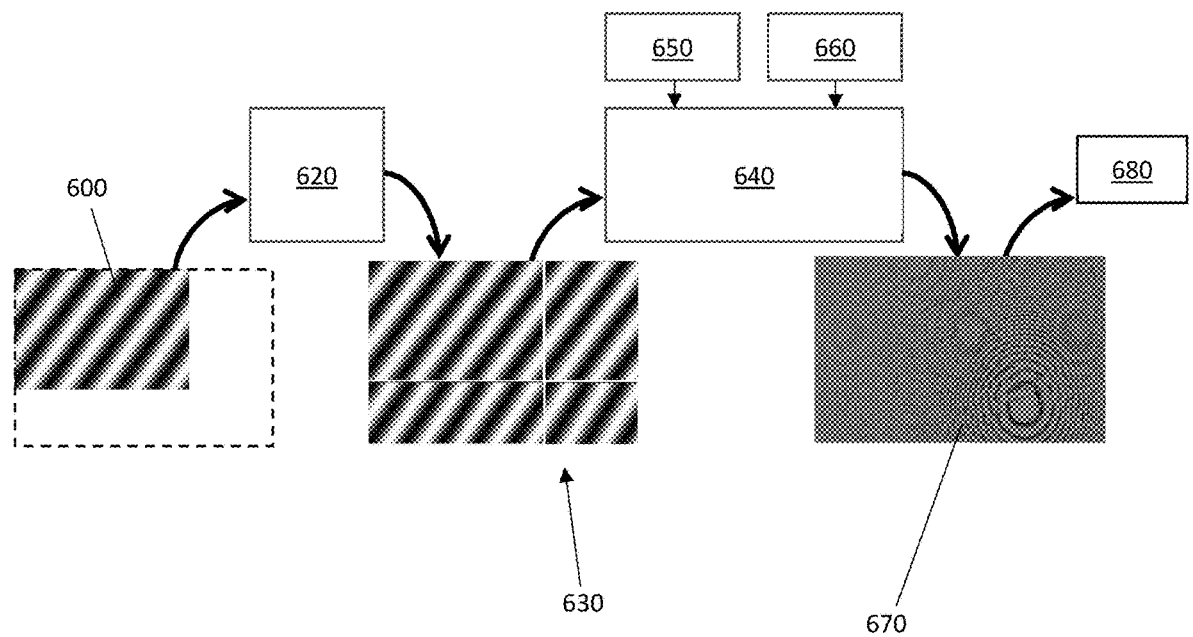
FIG. 6 shows a prior art method of forming a light modulation comprising a tiled hologram, lensing function and grating function.

FIG. 6 shows an example of preparing a hologram including tiles for display. A tiling engine 620 receives a first hologram 600 from a hologram engine. The first hologram 600 comprises [x×y] pixels. The tiling engine 620 forms a second hologram 630 by tiling the first hologram 600 onto a larger canvas. The second hologram 630 comprises [m×n] pixels, wherein mn>xy. By way of example only, the second hologram 630 comprises one full-tile and three part-tiles.

The second hologram 630 is formed by mapping pixels of the first hologram 600 in accordance with a tiling scheme. The tiling scheme may also be referred to as an addressing scheme or mapping scheme. The tiling scheme provides instructions as to which pixels of the first hologram 600 should be mapped to which pixels of the second hologram 630. As illustrated in FIG. 6, the second hologram 630 of this example comprises a subset of [x×y] pixels which are identical to the [x×y] pixels of the first hologram 600. The second hologram 630 also comprises three different subsets of pixels of the input hologram which each represent a contiguous, continuous subset of the [x×y] pixels of the first hologram 600. Each contiguous, continuous subset of pixels represent a complete sub-part of the first hologram 600. Again, each subset of pixels of the first hologram is referred to as a part-tile, where the full set of [x×y] pixels of the first hologram 600 is a full-tile which is identical to the first hologram 600. In this respect, the tiling scheme maps the pixels of the first hologram 600 to the second hologram 630 in groups of pixels, or tiles, rather than randomly assigning individual adjacent pixels of the first hologram 600 to completely different positions relative to another in the second hologram 630.

Once the second hologram 630 has been formed by the tiling engine 620, it can be displayed on a display device such as a spatial light modulator. Optionally, the second hologram 630 may be further processed before it is displayed on the display device. In the example shown in FIG. 6, an additional engine 640 for applying light processing functions to the second hologram 630 is provided. These light processing functions can include, for example, a lens function and/or a grating function (as described elsewhere in this disclosure). The additional engine 640 applies a lens function 650 and grating function 660 to the second hologram to form a third hologram 670 which can be displayed on the display device 680. The lens function 650 and grating function 660 may be combined with the second hologram by simple addition. The lens function and grating function may each be a phase-only pattern. The grating function may be a phase-ramp function.

A driver, such as a field-programmable gate array, may be used to send the pixel values of the third hologram 670 to the display device 680. Notably, the driver outputs each pixel of the third hologram 670 is provided to the display device 680 in accordance with a timing scheme or protocol defined by the display device. The timing scheme requires the driver to supply all pixel values of the third hologram 670 to the display device 680 within a time window defined by the display device 680. The data is streamed to the display device 680 one-by-one. In comparative examples, the data comprising the pixels values of the third hologram 670 is streamed to the display device one-by-one. The pixel values may be streamed in series, row-by-row. The number of pixel values in each data set streamed to the display device is a limiting factor of the system. Specifically, it defines how frequently each pixel receives a drive voltage. It therefore defines how frequently each pixel can be refreshed or rewritten. This has two significant consequences: firstly, it places an upper limit on the resolution of the display device (pixels per unit distance) and secondly, it places an upper limit on how many different sub-frames can be displayed during a frame (as will be described further in the following). In the comparative example described above, it is notable that the data of the entire third hologram is streamed by the driver to the spatial light modulator pixel-by-pixel.

The frequency at which each pixel can be refreshed determines the required capacitance of each pixel capacitor of an analogue backplane. The capacitance of each pixel capacitor determines the physical size of each pixel capacitor. The physical size of each pixel capacitor limits the physical size of each pixel in a liquid crystal on silicon device.

In some embodiments, the projected image is updated at a frame rate such as a video frame rate. In some embodiments, each pixel needs to be refreshed or rewritten plural times during one frame. Each frame may therefore comprise a plurality of sub-frames, wherein each sub-frame is display event. The sub-frames of a frame may be the same or different even though they produce or contribute to the same image. The sub-frame time may be less than the integration time of the human eye. In some embodiments, the tiling scheme is changed between sub-frames of the same image. This amounts to changing the size and/or position of tiles from one sub-frame to the next. If the first hologram is unchanged, tile-shifting does not change the image content. However, it may improve the image perceived by the viewer. In some embodiments, interlacing may be used at the sub-frame level to increase the resolution of the image. If the frequency at which each pixel is updated is increased, it can be possible to increase the number of different sub-frames that can be sent to the display device within the frame time. This increases the options for interlacing and tile-shifting at the sub-frame level. The present disclosure provides an alternative scheme to FIG. 6 which unlocks these possibilities.

Pixel Mapping

Figure 7:
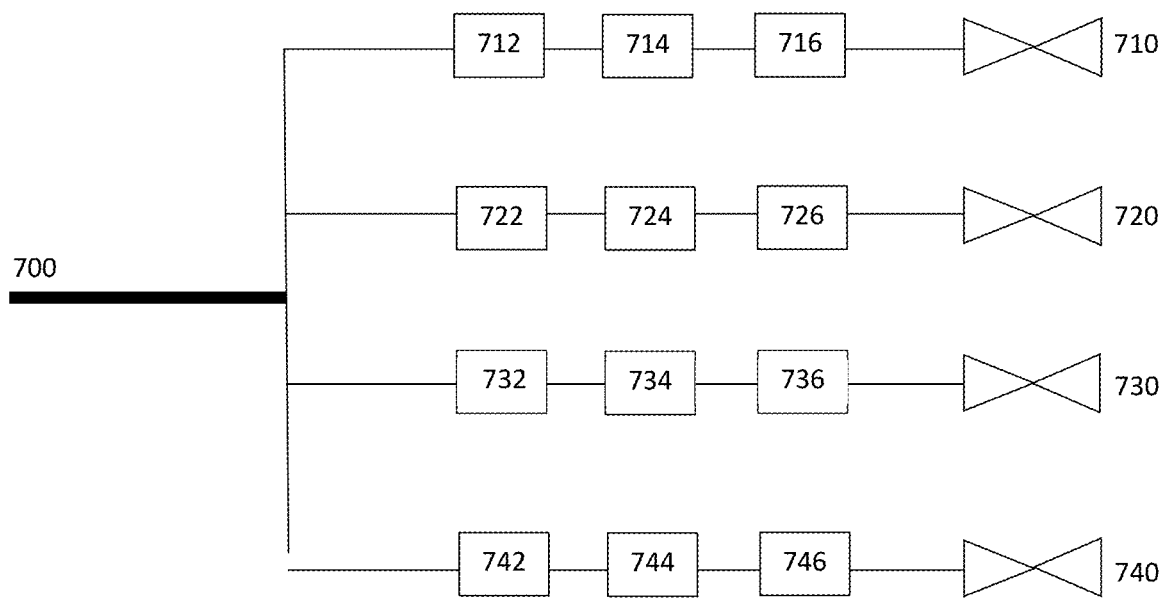
FIG. 7 shows pixel mapping circuitry of the silicon backplane in accordance with an embodiment of the present disclosure.

In embodiments of the present disclosure, the data line for each pixel is connected to a plurality of pixels. FIG. 7 shows a data line 700 carrying the pixel data corresponding to one pixel of the first hologram. In embodiments, the first hologram is tiled onto the display device by splitting the data line 700 into four branches which each connect to a respective light-modulating element 710, 720, 730, 740. The pixel data on each branch may be individually processed. For example, the pixel data on the first branch may be combined with first data 712, second data 714 and third data 716. The first data may be representative of a lensing function. The second data may be representative of a horizontal grating function. The third data may be representative of a vertical grating function. The lensing function and grating functions are each also represented by an array of discrete pixel values. Combining the hologram data with the lens and grating functions therefore comprises combining the pixel values of corresponding pixels. For example, the hologram pixel value in row a, column b may be combined with the lens pixel value in row a, column b to combine the hologram with the lensing function. In some embodiments, pixel values are combined by simple addition. The first, second and third data of each branch may be combined with the corresponding hologram pixel data in a single addition.

The pixel mapping architecture described in FIG. 7 therefore tiles the first hologram and applies at least one light processing function (e.g. lens and/or gratings). Notably, the pixel mapping circuitry which sends or routes each hologram pixel to a plurality of display pixels is embedded in the silicon backplane of the display device. For example, the pixel mapping circuitry may be part of the pixel addressing circuitry. As described further below, the pixel mapping circuitry may dynamically change the mapping between a data line and a plurality of pixels. Thus, the pixel mapping circuitry may include switching circuitry formed in the silicon backplane. The processing elements required to combine each hologram pixel with first, second and third data are part of the pixel circuits which are also embedded in the silicon backplane. In particular, each pixel circuit may include data storage (e.g. one or more memory cells) for storing the first, second and third data associated with the respective pixel, and respective circuit elements for combining (e.g. adding) the first, second and third data and the pixel data received on the data line. For example, respective first, second and third adder circuits may be provided in the path between the data line and a circuit element of the pixel circuit, such as a transistor for driving the pixel, to add the respective first, second and third data to the pixel data provided on the data line. The data storage for storing the first, second and third data associated with a pixel may be fixed or addressable. The skilled person will be able to design such circuitry in the silicon backplane using conventional (e.g. CMOS) circuit design tools. In accordance with these embodiments, the pixels of the display device can be refreshed more frequently. In the embodiment of FIG. 7, the amount of data that needs to be supplied to the display device before the first display pixel can be refreshed is reduced by a factor of four because each hologram pixel value is sent to four pixels of the display device. Functionality which is conventionally provided by the display driver (as shown in FIG. 6) is instead embedded in the silicon backplane of the display device. The demands placed on the display driver, which may be complex component of the system, are therefore reduced. The skilled person will understand that each data line may be sent to any number of pixels of the display device and FIG. 7 shows each hologram pixel value being sent to a group of four display pixels by way of example only. In some embodiments, all hologram pixels are sent to the same number of display pixels. In other embodiments, different hologram pixels are sent to different numbers of display pixels. In some embodiments, the mapping scheme defining the mapping or routing of each individual hologram pixel to a group of display pixels (of any number) may be dynamically switched. That is, an individual hologram pixel may be sent to different groups of display pixels at different times by transistors or a switching circuit associated with the pixel mapping circuit. The transistors or switching circuit may be controlled in accordance with a tiling scheme as described above.

Figure 8:
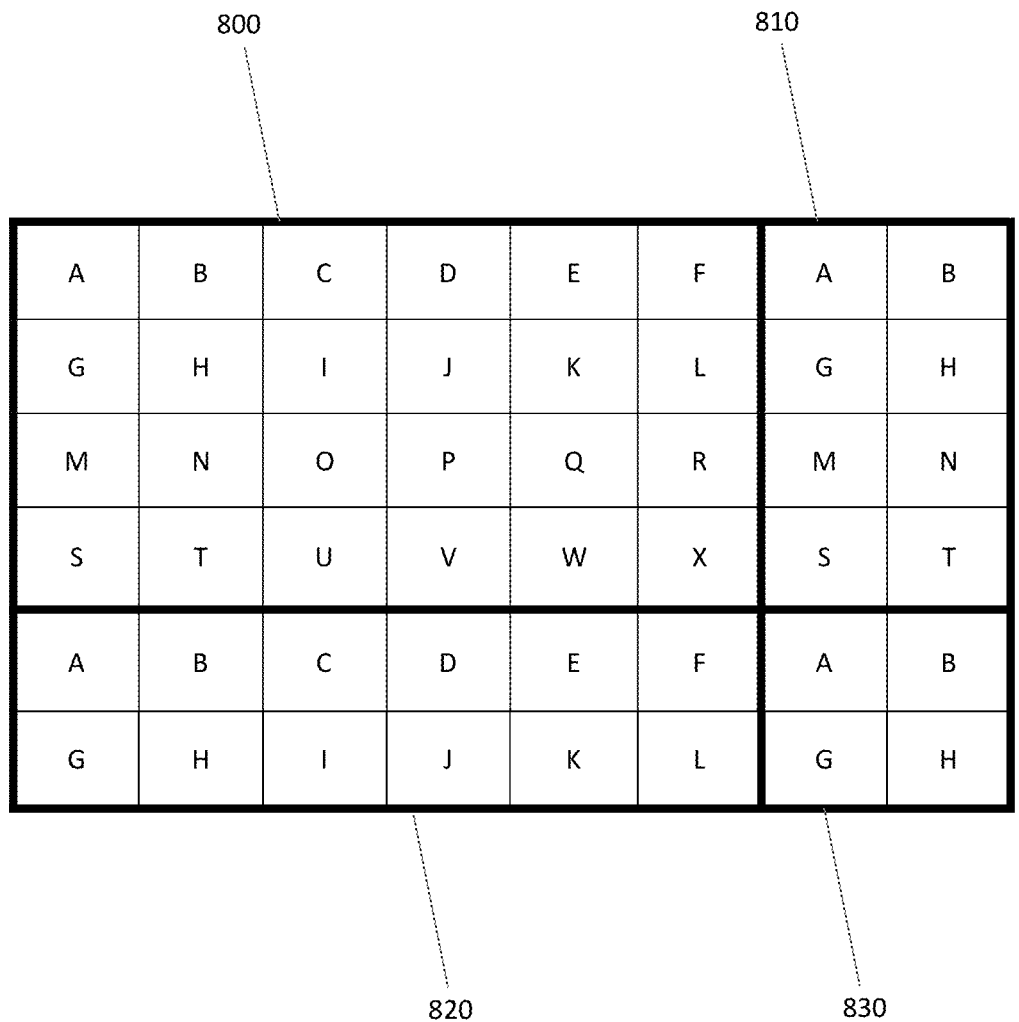
FIG. 8 shows an example tiling scheme in accordance with embodiments.

In the embodiment of FIG. 8, some hologram pixel values are sent to four display pixels, others are sent to only two display pixels and the remaining hologram pixels are only sent to one display pixel. In FIG. 8, hologram pixels A, B, G and H are sent to four display pixels. Hologram pixels M, N, S, T, C, D, E, F, I, J, K and L are each sent to two display pixels. Hologram pixels O, P, Q, R, U, V, W and X are only sent to one display pixel. This scheme forms a light-modulation pattern on the display device comprising a full-tile 800, a first part-tile 810, a second part-tile 820 and a third part-tile 830. In some embodiments, the pixel value of each light processing function is a determined by the spatial position of the pixel on the display device. That is, even though full-tile 800 and first part-tile 810 contain some pixels corresponding to the same hologram pixel (e.g. A or T), the light processing function combined with that hologram pixel value may be different. For example, the first data combined with hologram pixel A in full-tile 800 may be different to the first data combined with hologram pixel A in first part-tile 810. In these embodiments, it should therefore be understood that each light processing function combines with the second hologram as a whole. Unlike the first hologram, it may be said that each light processing function is not tiled. That is, each light processing function does not comprise a plurality of tiles.

In some embodiments, the pixel mapping circuitry is arranged to change or switch the mapping scheme between sub-frames of an image frame or between frames of a sequence of image frames to provide the tile-shifting described above. The skilled person will understand how transistors or a switching circuit comprising a plurality of switches may be incorporated with the pixel mapping circuitry to provide this functionality. The inventors have found that switching the pixel mapping between frames or sub-frames can improve image quality in a holographic projector. Each light modulation pattern displayed can be formed of any suitable arrangement of full-tiles and/or part-tiles. For example, the tiling scheme may comprise mapping two to eight tiles of the first hologram to the corresponding second hologram. Optionally, the tiling scheme may comprise mapping two to six tiles of the first hologram to the corresponding second hologram. Optionally, the tiling scheme may comprise mapping four tiles of the first hologram to the corresponding second hologram.

In embodiments, the light processing function providing an optical function and/or a steering function to the hologram may be changed. Thus, the values of the pixels of the light processing function stored in the data storage of the pixel circuits in the silicon backplane may be changed. In this case, the data storage of the pixel circuits is addressable. As the skilled person will appreciate, in many holographic display applications, a change in the light processing function occurs less frequently than a change in the hologram that may occur at every frame. Accordingly, the data storage in the pixel circuits is addressed and written to relatively infrequently, and in some applications only once.

Alternative Embodiments

In the above embodiments, a light processing function is combined with a pixel value received on a data line by a pixel circuit of an individual pixel in the silicon backplane. This necessitates adding hardware components (i.e. circuit elements) to the pixel circuit in the active area of the display device (i.e. embedded behind the pixels). As mentioned previously, the physical size of the pixel circuit is limited by the pixel size, and small pixels are generally preferred. Thus, increasing the size of the pixel circuit may limit the pixel size of the display device.

In alternative embodiments, the light processing function may be combined with the pixel value by pixel access circuitry in the silicon backplane. Since the pixel access circuitry is generally outside the active area of the display device, the additional circuit elements required to combine the light processing function with the pixel value do not limit the physical size of the pixels. As the skilled person will appreciate, pixel access circuitry (also known as pixel addressing circuitry) typically comprises column and row access circuitry/drivers formed in the silicon backplane, as shown in FIG. 4.

Figure 9:
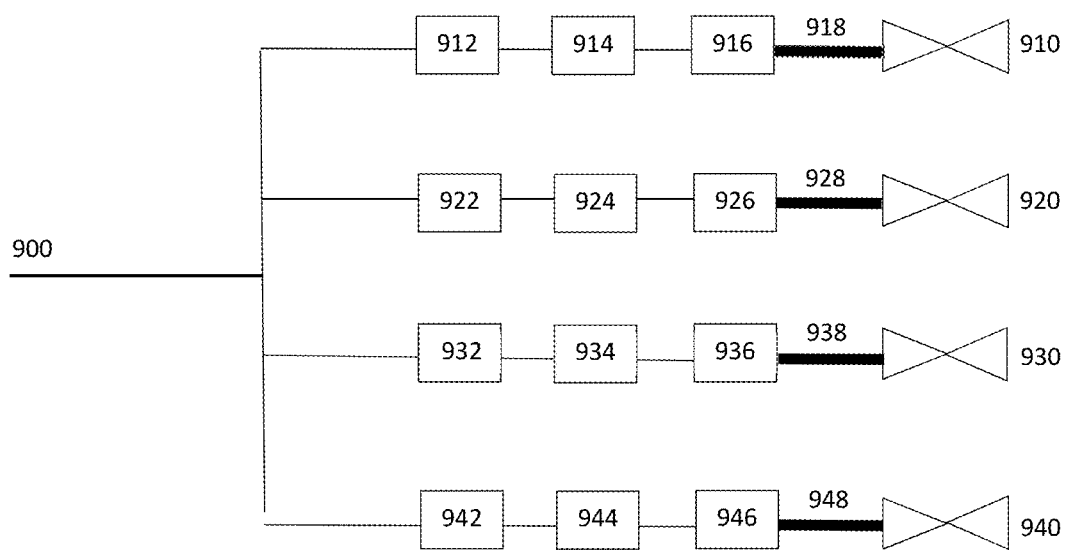
FIG. 9 shows pixel mapping circuitry of the silicon backplane in accordance with an alternative embodiment of the present disclosure.

Accordingly, in an alternative embodiment, the pixel mapping architecture of FIG. 7 may be modified as shown in FIG. 9. In particular, FIG. 9 shows a line 900 in the silicon backplane that receives pixel data corresponding to one pixel of a first hologram (e.g. from a display driver). The first hologram is tiled onto the display device by splitting the line 900 into four branches, which each connect to drive a data line 918, 928, 938, 948 of a respective light-modulating element 910, 920, 930, 940. The branches are provided within the pixel access circuitry in the silicon backplane, such as in the column driver and/or in the pixel mapping circuitry as described herein. The pixel data on each branch may be individually processed. For example, the pixel data on the first branch may be combined with first data 912, second data 914 and third data 916 for a first pixel 910. The first data may be representative of a lensing function (i.e. lens pixel value). The second data may be representative of a horizontal grating function (i.e. horizontal grating pixel value). The third data may be representative of a vertical grating function (i.e. vertical grating pixel value). In particular, as described herein, the lensing function and grating functions are each also represented by an array of discrete pixel values. Each branch therefore combines the hologram pixel value with light processing function pixel values for a pixel to output a combined pixel value for driving a respective pixel. For example, the hologram pixel value in row a, column b may be combined with the lens pixel value in row a, column b to combine the hologram with the lensing function. In some embodiments, pixel values are combined by simple addition. The first, second and third data of each branch may be combined with the corresponding hologram pixel data in a single addition. Accordingly, the pixel access circuitry includes a branch for each pixel of the display device, since each display pixel has an associated (unique) light processing function. The first, second and third data associated with each branch may be stored in fixed or addressable data storage as described herein. Each branch, for performing the combination of the hologram pixel value and light processing function (i.e. lens and/or grating function) pixel value(s), may be formed as part of the pixel access circuitry embedded in the silicon backplane. For example, the circuitry may be formed using conventional CMOS processing. Each branch is connected to a data line associated with the respective pixel. Thus, a pixel circuit associated with a pixel receives a pixel value comprising a combination of the hologram and light processing function(s) on the respective data line.

The alternative embodiment requires the same amount of additional circuitry elements as the first embodiment, but located outside the active area of the display device. Thus, the space taken up by the additional circuitry does not limit the physical size of the pixels. Each pixel is driven by an individual data signal combining the hologram data (which may be provided to a plurality of pixels) and the light processing function data (which is particular to the individual pixel) as in the prior art. Nevertheless, by combining the hologram data and light processing function data by circuitry in the silicon backplane, the processing load on the display driver or hologram calculation engine, which conventionally combine the hologram and light processing data is reduced. Furthermore, the speed of processing by the circuitry is faster than software processing architectures. Finally, as in the first embodiment, tiling schemes can also be applied by pixel mapping circuitry or pixel access circuitry in the silicon backplane of the display device.

Accordingly, there is provided a spatial light modulator having a plurality of pixels arranged to display a light modulation pattern comprising a hologram having a plurality of pixels. The spatial light modulator is a liquid crystal on silicon spatial light modulator comprising a silicon backplane. Each pixel of the spatial light modulator comprises a light-modulating element having a respective pixel circuit embedded in the silicon backplane. Each pixel circuit is arranged to drive the respective light-modulating element. The spatial light modulator further comprises pixel access circuitry embedded in the silicon backplane. The pixel access circuitry is arranged to provide a data signal to each pixel circuit. The pixel access circuitry is arranged to combine a received pixel value of the hologram with a corresponding pixel value of a light processing function such that the light modulation pattern further comprises the light processing function. The light processing function comprises a lens function and/or a grating function.

The spatial light modulator described herein may be used as part of a holographic projector. Optionally, the holographic projector further comprises a light source arranged to illuminate the spatial light modulator. Illumination of the spatial light modulator when the light modulation pattern is displayed or represented on the spatial light modulator enables the formation of a holographic reconstruction corresponding to the first hologram. The light source may be an at least partially spatially coherent light source, a spatially coherent light source, or a laser. Optionally, the holographic projector further comprises a screen such as a diffuser on which the holographic reconstruction is formed. The position of the screen relative to the spatial light modulator may be determined, at least in part, by the optical power of the lensing function combined with the first hologram. For example, the screen may be positioned at the focal plane of the lensing function combined with the first hologram.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A spatial light modulator having a plurality of pixels of the spatial light modulator arranged to display a light modulation pattern comprising a hologram having a plurality of pixels of the hologram,
wherein the spatial light modulator is a liquid crystal on silicon spatial light modulator comprising a silicon backplane and each pixel of the spatial light modulator comprises a light-modulating element and a respective pixel circuit embedded in the silicon backplane, wherein each pixel circuit is arranged to drive the respective light-modulating element, and
each pixel circuit is further arranged to combine a received pixel value of the hologram with a corresponding pixel value of a light processing function such that the light modulation pattern further comprises the light processing function,
wherein the light processing function comprises a lens function or a grating function.

2. A spatial light modulator as claimed in claim 1 wherein the hologram comprises [x×y] pixels and the spatial light modulator comprises [m×n] pixels, wherein mn>xy, and the silicon backplane further comprises pixel mapping circuitry arranged to receive each pixel value of the hologram and route each pixel value of the hologram to a plurality of the pixels of the spatial light modulator such that the hologram is tiled onto the light-modulating elements of the spatial light modulator using the pixel mapping circuitry.

3. A spatial light modulator as claimed in claim 2 wherein the pixel mapping circuitry is arranged to change a scheme for routing each pixel value of the hologram to a plurality of pixels of the spatial light modulator in accordance with a tiling scheme.

4. A spatial light modulator as claimed in claim 1 wherein m≥2x and n≥2y and each pixel value of the hologram is routed to at least four pixels of the spatial light modulator.

5. A spatial light modulator as claimed in claim 1 wherein the hologram is tiled onto the spatial light modulator such that there is displayed thereon at least one full-tile of the hologram, wherein a full-tile of the hologram is a complete, contiguous group of [x×y] pixels of the hologram.

6. A spatial light modulator as claimed in claim 1 wherein adjacent tiles of the hologram are connected end to end.

7. A spatial light modulator as claimed in claim 1 wherein each pixel circuit comprises a pixel capacitor connected to the light-modulating element, wherein the pixel capacitor is arranged to charge the light-modulating element.

8. A holographic projector comprising the spatial light modulator as claimed in claim 1 and a light source arranged to illuminate the light modulation pattern with coherent light such that a holographic reconstruction corresponding to the hologram is formed on a replay plane spatially separated from the spatial light modulator.

9. A holographic projector as claimed in claim 8 further comprising a driver arranged to send a plurality of holograms, each comprising [x×y] pixels, to the spatial light modulator.

10. A method of displaying a light modulation pattern comprising a hologram having a plurality of pixels of the hologram on a spatial light modulator having a plurality of pixels of the spatial light modulator, wherein the spatial light modulator is a liquid crystal on silicon spatial light modulator comprising a silicon backplane and each pixel of the spatial light modulator comprises a light-modulating element and a respective pixel circuit embedded in the silicon backplane, and the method comprises each pixel circuit:
combining a received pixel value of the hologram with a corresponding pixel value of a light processing function such that the light modulation pattern displayed on the spatial light modulator further comprises the light processing function, wherein the light processing function is a lens function or a grating function.

11. A method of displaying a light modulation pattern as claimed in claim 10, wherein the hologram comprises [x×y] pixels and the spatial light modulator comprises [m×n] pixels, wherein mn>xy, and the method further comprises:
routing each pixel value of the hologram to a plurality of pixels of the spatial light modulator using pixel mapping circuitry embedded in the silicon backplane of the spatial light modulator such that the hologram is tiled onto the light-modulating elements of the spatial light modulator.

12. A method of displaying a light modulation pattern as claimed in claim 10 wherein the hologram is tiled onto light-modulating elements of the spatial light modulator by connecting tiles of the hologram end to end.

13. A method of holographic projection comprising the method of displaying a light modulation pattern as claimed in claim 10 and further comprising illuminating the light modulation pattern with coherent light from a light source to form a holographic reconstruction corresponding to the hologram on a replay plane spatially separated from the spatial light modulator.

14. A method of holographic projection according to claim 13, further comprising reperforming the method steps of claim 13 to form a second holographic reconstruction corresponding to a second hologram and using the grating function to displace the second holographic reconstruction on the replay plane with respect to a first holographic reconstruction such that image spots of the second holographic reconstruction are formed in the spaces between image spots of the first holographic reconstruction.

15. A method of holographic projection as claimed in claim 14 wherein the first and second holographic reconstructions are interlaced such that a viewer of the replay plane perceives a holographic reconstruction having a higher resolution than the first holographic reconstruction or second holographic projection alone.

* * * * *